United States Patent
Hojdis et al.

(10) Patent No.: US 11,326,028 B2
(45) Date of Patent: May 10, 2022

(54) SULFUR-CROSSLINKED RUBBER MIXTURE FOR VEHICLE TIRES, CONTAINING CARBON NANOTUBES (CNT), VEHICLE TIRE HAVING THE SULFUR-CROSSLINKED RUBBER MIXTURE, AND METHOD FOR PRODUCING THE SULFUR-CROSSLINKED RUBBER MIXTURE CONTAINING CARBON NANOTUBES

(71) Applicant: Continental Reifen Deutschland GmbH, Hannover (DE)

(72) Inventors: Nils Hojdis, Wuppertal (DE); Carla Recker, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 153 days.

(21) Appl. No.: 16/610,213

(22) PCT Filed: Mar. 19, 2018

(86) PCT No.: PCT/EP2018/056808
§ 371 (c)(1),
(2) Date: Nov. 1, 2019

(87) PCT Pub. No.: WO2018/210471
PCT Pub. Date: Nov. 22, 2018

(65) Prior Publication Data
US 2021/0163696 A1 Jun. 3, 2021

(30) Foreign Application Priority Data
May 15, 2017 (DE) ...................... 10 2017 208 137.6

(51) Int. Cl.
| C08J 5/00 | (2006.01) |
| B60C 1/00 | (2006.01) |
| B60C 19/08 | (2006.01) |
| C08L 7/00 | (2006.01) |
| C08K 3/04 | (2006.01) |

(52) U.S. Cl.
CPC ............. *C08J 5/005* (2013.01); *B60C 1/0016* (2013.01); *B60C 1/0025* (2013.01); *B60C 19/08* (2013.01); *C08K 3/041* (2017.05); *C08L 7/00* (2013.01); *C08J 2307/00* (2013.01); *C08J 2409/06* (2013.01); *C08J 2471/02* (2013.01); *C08L 2205/035* (2013.01); *C08L 2310/00* (2013.01)

(58) Field of Classification Search
CPC ..... B60C 1/0016; B60C 1/0025; B60C 19/08; C08J 5/005; C08J 2409/06; C08J 2307/00; C08J 2471/02; C08K 3/041; B29B 7/7495; C08L 7/00; C08L 2205/035; C08L 2310/00
See application file for complete search history.

(56) References Cited

U.S. PATENT DOCUMENTS

| 7,785,701 B2 | 8/2010 | Noguchi et al. |
| 2002/0055564 A1 | 5/2002 | Cruse et al. |
| 2008/0161452 A1 | 7/2008 | York et al. |
| 2008/0161460 A1 | 7/2008 | York et al. |
| 2008/0161462 A1 | 7/2008 | York et al. |
| 2008/0161475 A1 | 7/2008 | York et al. |
| 2009/0221751 A1 | 9/2009 | Hasse et al. |
| 2010/0108239 A1 | 5/2010 | Recker et al. |
| 2013/0131240 A1 | 5/2013 | Uekita et al. |
| 2016/0108202 A1 | 4/2016 | Bosnyak et al. |
| 2017/0050158 A1 | 2/2017 | Bosnyak et al. |
| 2017/0073508 A1* | 3/2017 | Schwekendiek ....... C08K 5/548 |
| 2018/0312015 A1* | 11/2018 | Kendziorra ........... B60C 19/088 |

FOREIGN PATENT DOCUMENTS

| CN | 103313934 A | 9/2013 |
| CN | 104513410 A | 4/2015 |
| CN | 105037830 A | 11/2015 |
| CN | 105459284 A | 4/2016 |
| CN | 105482175 A | 4/2016 |
| CN | 105670055 A | 6/2016 |
| CN | 105860133 A | 8/2016 |
| CN | 105924705 A | 9/2016 |
| CN | 106146932 A | 11/2016 |
| DE | 102006004062 A1 | 8/2007 |
| EP | 2589619 A1 | 5/2013 |
| WO | 9909036 A1 | 2/1999 |
| WO | 2008083241 A2 | 7/2008 |
| WO | 2008083242 A1 | 7/2008 |
| WO | 2008083243 A1 | 7/2008 |
| WO | 2008083244 A1 | 7/2008 |
| WO | 2012080160 A2 | 5/2010 |
| WO | 2012080158 A1 | 6/2012 |

(Continued)

OTHER PUBLICATIONS

International Search Report dated Jun. 26, 2019 of international application PCT/EP2018/056808 on which this application is based.

(Continued)

*Primary Examiner* — Angela C Scott

(74) *Attorney, Agent, or Firm* — David L. Cate; Gregory Adams

(57) ABSTRACT

A sulfur-crosslinked rubber mixture for vehicle tires including carbon nanotubes (CNT), to a vehicle tire comprising the sulfur-crosslinked rubber mixture and to a process for producing the sulfur-crosslinked rubber mixture comprising CNT. The sulfur-crosslinked rubber mixture according to the invention is characterized in that the CNT are predispersed in at least one polyisoprene. The vehicle tire according to the invention preferably comprises the sulfur-crosslinked rubber mixture in the tread and/or a sidewall and/or a conductivity track.

19 Claims, 1 Drawing Sheet

(56) References Cited

FOREIGN PATENT DOCUMENTS

| WO | 2012080160 A1 | 6/2012 | | |
|---|---|---|---|---|
| WO | WO-2015172915 A1 | * | 11/2015 | ............... B60C 1/00 |
| WO | 2016029798 A1 | | 3/2016 | |
| WO | WO-2017067679 A1 | * | 4/2017 | ........... B60C 19/084 |

OTHER PUBLICATIONS

Database WPI Week 201623—Thomson Scientific, London, GB an 2016-14450B XP002782066.

* cited by examiner

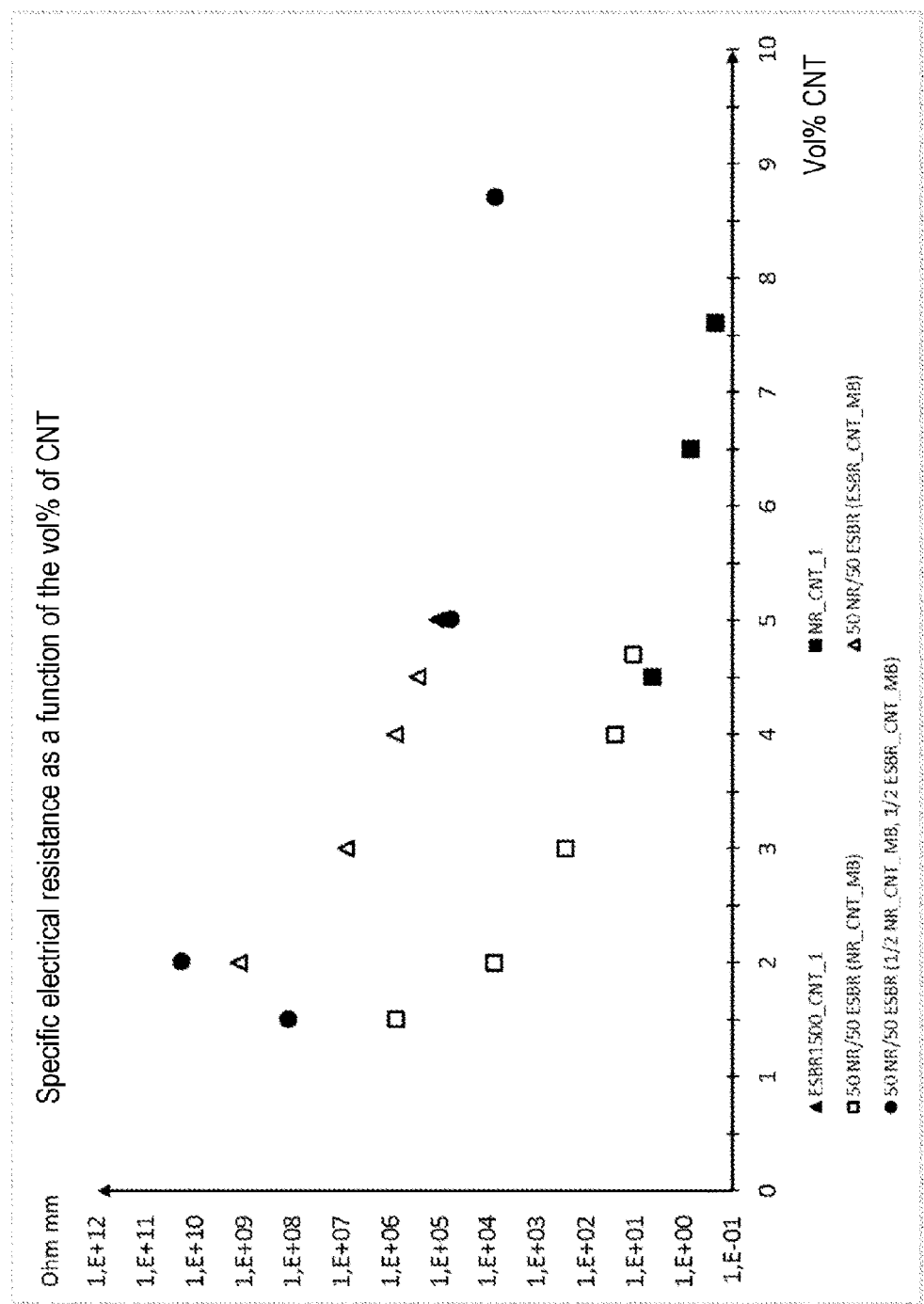

SULFUR-CROSSLINKED RUBBER MIXTURE FOR VEHICLE TIRES, CONTAINING CARBON NANOTUBES (CNT), VEHICLE TIRE HAVING THE SULFUR-CROSSLINKED RUBBER MIXTURE, AND METHOD FOR PRODUCING THE SULFUR-CROSSLINKED RUBBER MIXTURE CONTAINING CARBON NANOTUBES

The invention relates to a sulfur-crosslinked rubber mixture for vehicle tires containing carbon nanotubes (CNT), to a vehicle tire comprising the sulfur-crosslinked rubber mixture and to a process for producing the sulfur-crosslinked rubber mixture containing CNT.

The rubber compositions of the individual components of vehicle tires, especially the composition of the tread, determine the running properties thereof to a high degree. The mixture and vulcanizate properties are influenced by adding a wide variety of different admixtures to the mixtures and/or using specific polymers. Examples of admixtures that may be mentioned here are fillers (e.g. carbon black), plasticizers, aging stabilizers and different crosslinking systems composed of sulfur, accelerator and activator.

WO 2012/080160 A1 discloses a rubber mixture for treads of vehicle tires which contains a masterbatch of carbon nanotubes (CNT) in ESBR (emulsion-polymerized styrene-butadiene rubber). Compared to a mixture without CNT such a mixture shows improved indicators for traction in wintry conditions, dry handling behavior and rolling resistance.

Having regard to the prior art it is an object of the present invention to provide a sulfur-crosslinked rubber mixture containing carbon nanotubes (CNT) which features optimized electrical conductivity properties, wherein the further properties, in particular abrasion behavior, remain at the same level or are even likewise improved.

This object is achieved when in the sulfur-crosslinked rubber mixture the CNT are predispersed in at least one polyisoprene.

It has surprisingly been found that this provides the sulfur-crosslinked rubber mixture with an unexpectedly good electrical conductivity. This effect is apparent in particular upon comparison with rubber mixtures containing polymer blends of styrene-butadiene rubbers and polyisoprene; the unexpectedly high electrical conductivity is observed in the case where the CNT are predispersed in at least one polyisoprene (polyisoprene-CNT masterbatch).

At the same time the other tire properties remain at approximately the same high level or are even improved, the abrasion properties of the rubber mixture in particular remaining at approximately the same high level or even being improved.

It is a further object of the present invention to provide a vehicle tire which exhibits an improvement over the prior art in terms of conductivity. The object is achieved when the vehicle tire includes, at least in one component, at least one sulfur-crosslinked rubber mixture having the features recited hereinabove or more particularly elucidated hereinbelow.

Vehicle tires which contain the rubber mixture according to the invention in at least one component, preferably at least in the tread and/or at least one sidewall and/or at least one conductivity track have an improved conductivity. If the vehicle tire contains the sulfur-crosslinked rubber mixture according to the invention at least in the tread the abrasion behavior at least remains at the same level or is likewise improved.

In the case of two-part treads (upper part: cap and lower part: base), the rubber mixture according to the invention may be used both for the cap and for the base. It is preferable when at least the cap comprises at least one sulfur-crosslinked rubber mixture according to the invention.

A "sulfur-crosslinked rubber mixture" is to be understood as meaning a rubber mixture produced from a ready-to-use rubber mixture (or a rubber raw mixture) by sulfur vulcanization. A sulfur-crosslinked rubber mixture is thus a vulcanizate.

In the context of the present invention a conductivity track is any implementation of a rubber mixture known to those skilled in the art which is suitable for ensuring conductivity between at least two tire components and/or at least one inner tire component and the road surface or other external surfaces with which the tire comes into contact. The conductivity track may be a so-called "carbon center beam" or else a strip arranged in the shoulder region of the vehicle tire. The conductivity track may furthermore also be arranged between an electrically conductive tire component and a tire sensor and thus to transmit to the sensor information about the electrical conductivity of the tire.

In the context of the present invention "vehicle tires" is to be understood as meaning pneumatic vehicle tires and solid rubber tires, including tires for industrial and construction site vehicles, truck, car and bicycle and motorcycle tires.

The rubber mixture according to the invention is further also suitable for other components of vehicle tires, for example in particular the flange profile, and also for inner tire components. The rubber mixture according to the invention is further also suitable for other technical rubber articles, such as bellows, conveyor belts, air springs, belts, drive belts or hoses, and also footwear soles.

The constituents of the sulfur-crosslinked rubber mixture according to the invention are more particularly described hereinbelow. All elucidations also apply to the vehicle tire according to the invention which includes at least one rubber mixture according to the invention in at least one component. The description of the individual constituents relates to the rubber mixture before vulcanization, i.e. the sulfur-crosslinkable rubber mixture, unless otherwise stated.

The unit "phr" (parts per hundred parts of rubber by weight) used in this document is the standard unit of quantity for mixture recipes in the rubber industry. In this document the parts by weight of the individual substances which are metered are based on 100 parts by weight of the total composition of all rubbers present in the mixture, i.e. the at least one polyisoprene plus optionally further sulfur-crosslinkable rubbers that are added to the rubber mixture according to the invention.

The invention provides a sulfur-crosslinked rubber mixture containing carbon nanotubes (CNT). All types of CNT known to those skilled in the art are in principle comprised in the subject matter of the invention. Discrete carbon nanotubes have an elongate shape and therefore have a high aspect ratio. The aspect ratio corresponds to the quotient of the average length of the CNT divided by the average diameter of the CNT.

In a preferred embodiment of the invention the CNT have an aspect ratio of 10 to 200, particularly preferably 30 to 150, very particularly preferably 50 to 120. As is known to those skilled in the art the dimensions of the CNT are determined by scanning electron microscopy (SEM).

In a preferred embodiment of the invention the CNT have a length of 0.2 µm to 1.4 µm, preferably 0.5 µm to 1 µm, i.e. 200 nm to 1400 nm, preferably 500 nm to 1000 nm.

It is essential to the invention that the CNT are predispersed in at least one polyisoprene. Surprisingly only the predispersing of CNT in at least one polyisoprene results in a surprisingly high electrical conductivity.

This is to be understood as meaning that the CNT are preferably predispersed exclusively in at least one polyisoprene and that there are no additional masterbatches present in the rubber mixture in which CNTs are predispersed in a rubber matrix other than polyisoprene. In particular the rubber mixture according to the invention preferably does not contain any masterbatch in which CNT are predispersed in ESBR. The presence of plasticizers or other substances in the masterbatches is unaffected, i.e. a polyisoprene-CNT masterbatch may include further substances, such as plasticizers, see below.

The at least one polyisoprene may be a natural polyisoprene (NR, natural rubber) and/or a synthetic polyisoprene (IR).

In all embodiments both cis-1,4-polyisoprene and 3,4-polyisoprene may be concerned. However, the use of cis-1,4-polyisoprenes having a cis-1,4 proportion of >90% by weight is preferred. Such a polyisoprene is firstly obtainable by stereospecific polymerization in solution with Ziegler-Natta catalysts or using finely divided lithium alkyls. Secondly, natural rubber (NR) is one such cis-1,4-polyisoprene; the cis-1,4 content in the natural rubber is greater than 99% by weight.

A mixture of one or more natural polyisoprenes with one or more synthetic polyisoprenes is further also conceivable.

In a preferred embodiment of the invention the at least one polyisoprene is at least one natural polyisoprene. This results in particularly good properties in respect of the demands on the rubber mixture for use in at least one tire component while achieving exceptional electrical conductivity.

It is essential to the invention that the CNT in the at least one polyisoprene are predispersed, i.e. predistributed and preferably disentangled from one another. The CNT are therefore preferably present in the at least one polyisoprene in the form of individual, separate CNT. However it is not inconceivable for agglomerates to remain. Thus in the rubber mixture according to the invention the CNT may be in the form of individual CNT and optionally also of agglomerates. SEM may be used to determine length and diameter both of the separate CNT and of the agglomerates and for details thereof reference is made to the elucidations in WO 2012/080160 A1. Agglomerates are in the form of bundles of CNT. In this case an effective aspect ratio is then determined as the quotient of the average length (arithmetic average) and the bundle diameter.

The dispersing of the CNT in the at least one polyisoprene is carried out by processes known to those skilled in the art such as for example by the processes described hereinbelow.

As described in U.S. Pat. No. 7,785,701 the dispersing of CNT may be effected by shear forces, for example by one of the following processes:

kneading on a roller mill with a nip width of 0.5 mm or less ("open-roll method");
kneading in a closed mixer ("closed kneading method") with a rotor spacing of 1 mm or less;
kneading in a multi-screw extruder ("multi-screw extruding kneading method") with a screw spacing of 0.3 mm or less.

Incorporation of CNT into a rubber matrix in an internal mixer at 110° C. for 30 minutes is described in S. Sagar et al.: "MWCNTS Incorporated Natural Rubber Composites: Thermal Insulation, Phase Transition and Mechanical Properties" in IACSIT International Journal of Engineering and Technology (June 2014), vol. 6, no. 3, p. 168.

CNTs may also be integrated into a rubber matrix through initial wetting with ethanol and subsequent evaporation of the ethanol such as is described for example in H. H. Le et al.: "Effect of rubber polarity on selective wetting of carbon nanotubes in ternary blends" in eXPRESS Polymer Letters (2015), vol. 9, no. 11, p. 960-971.

The CNT and the at least one polyisoprene in which they are predispersed form a masterbatch which may containing further constituents.

The viscosity of the masterbatch (Mooney ML1+4 at 100° C.) is preferably 80 to 120 MU.

The weight fraction of the CNT in the masterbatch is preferably 0.1% to 20% by weight based on the total amount of the masterbatch.

In a particularly advantageous embodiment of the invention the proportion of CNT in the masterbatch is 13% to 20% by weight, particularly preferably 14% to 18% by weight, in particular and for example 15% to 17% by weight. Such a concentration of the CNT in the masterbatch of at least one polyisoprene achieves a good distribution of the CNT in the polyisoprene and a particularly good electrical conductivities coupled with otherwise good tire properties in the sulfur-crosslinked rubber mixture.

As a further constituent the masterbatch may especially contain at least one plasticizer. The weight fraction of the plasticizer based on the total amount of the masterbatch is preferably 0.1% to 20% by weight. In an advantageous embodiment of the invention said fraction is 6% to 16% by weight, particularly preferably 8% to 14% by weight, in particular and for example 9% to 10% by weight.

Here too, the weight fraction of the CNT in the masterbatch is preferably 0.1% to 20% by weight based on the total amount of the masterbatch and in a particularly advantageous embodiment of the invention 13% to 20% by weight, particularly preferably 14% to 18% by weight, in particular and for example 15% to 17% by weight.

The amount of CNT in the sulfur-crosslinked rubber mixture is preferably 0.1 to 25 phr (MB=rubber+CNT), preferably 0.1 to 15 phr. Such amounts achieve an improvement in electrical conductivity coupled with good rolling resistance behavior.

In a preferred embodiment the rubber mixture according to the invention contains 0.1 to 2 phr of CNT. This amount particularly advantageously solves the conflict of objectives of high electrical conductivity coupled with lowest possible rolling resistance.

In an advantageous embodiment of the invention the sulfur-crosslinked rubber mixture contains in addition to the polyisoprene in which the CNT are predispersed at least one further rubber that is sulfur-crosslinkable prior to the vulcanization and thus at least one further diene rubber.

The term diene rubbers is to be understood as meaning rubbers that are formed by polymerization or copolymerization of dienes and/or cycloalkenes and thus comprise C=C double bonds either in the main chain or in the side groups.

The at least one further diene rubber is preferably selected from the group consisting of natural polyisoprene and/or synthetic polyisoprene and/or epoxidized polyisoprene and/or butadiene rubber and/or butadiene-isoprene rubber and/or solution-polymerized styrene-butadiene rubber and/or emulsion-polymerized styrene-butadiene rubber and/or styrene-isoprene rubber and/or liquid rubbers having a molecular weight $M_w$ of greater than 20 000 g/mol and/or halobutyl rubber and/or polynorbornene and/or isoprene-isobutylene copolymer and/or ethylene-propylene-diene rubber and/or nitrile rubber and/or chloroprene rubber and/or acrylate rubber and/or fluoro rubber and/or silicone rubber and/or polysulfide rubber and/or epichlorohydrin rubber and/or styrene-isoprene-butadiene terpolymer and/or hydrogenated acrylonitrile-butadiene rubber and/or hydrogenated styrene-butadiene rubber.

Nitrile rubber, hydrogenated acrylonitrile-butadiene rubber, chloroprene rubber, butyl rubber, halobutyl rubber or ethylene-propylene-diene rubber in particular are employed in the production of technical rubber articles, such as belts, drive belts and hoses, and/or shoe soles.

The rubber mixture is suitable in particular for vehicle tires and may in principle be used in any component, such as in particular the tread, the sidewall, the flange profile, and also in other so-called body components.

To this end the diene rubber is preferably selected from the group consisting of synthetic polyisoprene (IR) and natural polyisoprene (NR) and styrene-butadiene rubber (SBR) and polybutadiene (BR) and butyl rubber (IIR) and halobutyl rubber. The diene rubber is particularly preferably selected from the group consisting of synthetic polyisoprene (IR) and natural polyisoprene (NR) and styrene-butadiene rubber (SBR) and polybutadiene (BR) which results in particularly good properties in respect of the requirements in the vehicle tire.

The above elucidations in respect of microstructure etc. apply to the synthetic or natural polyisoprene which may be added as at least one further sulfur-crosslinkable rubber.

If the rubber mixture according to the invention contains butadiene rubber (i.e. BR, polybutadiene) any of the types known to those skilled in the art may be concerned. These include inter alia the so-called high-cis and low-cis types, wherein polybutadiene having a cis content of not less than 90% by weight is referred to as high-cis type and polybutadiene having a cis content of less than 90% by weight is referred to as low-cis type. A low-cis polybutadiene is for example Li—BR (lithium-catalyzed butadiene rubber) having a cis content of 20% to 50% by weight. Particularly good abrasion properties and low hysteresis of the rubber mixture are achieved with a high-cis BR.

The polybutadiene(s) employed may be end group-modified with modifications and functionalizations and/or be functionalized along the polymer chains. The modification may be selected from modifications with hydroxyl groups and/or ethoxy groups and/or epoxy groups and/or siloxane groups and/or amino groups and/or aminosiloxane and/or carboxyl groups and/or phthalocyanine groups and/or silane-sulfide groups. However, other modifications known to those skilled in the art, also known as functionalizations, are also suitable. Metal atoms may be a constituent of such functionalizations.

In the case where at least one styrene-butadiene rubber (styrene-butadiene copolymer) is present in the rubber mixture this or these may be selected from solution-polymerized styrene-butadiene rubber (SSBR) and emulsion-polymerized styrene-butadiene rubber (ESBR), a mixture of at least one SSBR and at least one ESBR also being employable. The terms "styrene-butadiene rubber" and "styrene-butadiene copolymer" are used synonymously in the context of the present invention.

The styrene-butadiene copolymer used may be end group-modified and/or functionalized along the polymer chains with the modifications and functionalizations recited above for the polybutadiene.

In an advantageous embodiment of the invention the rubber mixture contains at least one further reinforcing filler, wherein the quantity ratio of further reinforcing fillers to CNT is 1000:1 to 2:1. The ratio is particularly preferably 200:1 to 2:1, very particularly preferably 80:1 to 2:1.

In the context of the present invention "further reinforcing fillers" is to be understood as including in principle all fillers that provide a reinforcing effect in a rubber mixture, i.e. in particular alter the viscoelastic properties by interaction with the rubber matrix. The amount of the at least one further reinforcing filler is preferably 0.1 to 250 phr, particularly preferably 20 to 250 phr, very particularly preferably 20 to 150 phr.

The further reinforcing filler is preferably at least one carbon black and/or at least one silica.

In a preferred embodiment of the invention the rubber mixture contains 0.1 to 250 phr, preferably 2 to 200 phr, particularly preferably 10 to 100 phr, in turn preferably 20 to 80 phr, of at least one carbon black.

In the context of the present invention all carbon black types known to the skilled person are conceivable in principle. However, it is preferable to employ a carbon black having an iodine adsorption number according to ASTM D 1510 of 20 to 180 g/kg, particularly preferably 30 to 140 g/kg, and a DBP number according to ASTM D 2414 of 30 to 200 ml/100 g, preferably 90 to 180 ml/100 g, particularly preferably 110 to 180 ml/100 g. A particularly suitable carbon black for the purposes of the present invention is for example a carbon black of ASTM type N339 having an iodine adsorption number of 90 g/kg and a DBP number of 120 ml/100 g. This achieves for use in the vehicle tire, in particular in the tread.

Silicas are known to those skilled in the art as reinforcing fillers. In a preferred embodiment of the invention the rubber mixture contains 0.1 to 30 phr of at least one silica, preferably 5 to 30 phr of at least one silica. A so-called partial silica mixture may thus also be concerned.

In a further preferred embodiment of the invention the rubber mixture contains 5 to 250 phr, particularly preferably 20 to 200 phr, in turn preferably 20 to 100 phr, of at least one silica.

The silicas may be the silicas known to those skilled in the art that are suitable as a filler for tire rubber mixtures. However, it is particularly preferable to use a finely divided precipitated silica which has a nitrogen surface area (BET surface area) (according to DIN ISO 9277 and DIN 66132) of 35 to 350 $m^2/g$, preferably of 35 to 260 $m^2/g$, particularly preferably of 70 to 235 $m^2/g$ and very particularly preferably of 70 to 205 $m^2/g$, and a CTAB surface area (according to ASTM D 3765) of 30 to 400 $m^2/g$, preferably of 30 to 255 $m^2/g$, particularly preferably of 65 to 230 $m^2/g$ and very particularly preferably of 65 to 200 $m^2/g$.

Such silicas result, for example in rubber mixtures for inner tire components, in particularly good physical properties of the vulcanizates. Advantages in mixture processing through a reduction in mixing time are also attainable while retaining the same product characteristics, thus leading to improved productivity. Employable silicas thus include for example not only those of the type Ultrasil® VN3 (trade name) from Evonik but also silicas having a relatively low BET surface area (such as for example Zeosil® 1115 or Zeosil® 1085 from Solvay) and highly dispersible silicas, so-called HD silicas (for example Zeosil® 1165 MP from Solvay).

Further optionally reinforcing fillers are for example graphite and graphenes and so-called "carbon-silica dual-phase fillers".

The rubber mixture according to the invention may contain further non-reinforcing fillers, preferably in very small amounts, i.e. preferably 0 to 3 phr. In the context of the present invention the further non-reinforcing fillers include aluminosilicates, kaolin, chalk, starch, magnesium oxide, titanium dioxide or rubber gels and also fibers (for example aramid fibers, glass fibers, carbon fibers, cellulose fibers). In the context of the present invention zinc oxide does not belong to the group of fillers.

The optionally present silica may be present in the form of bonded or unbonded silica. In the case where the silica is present in the form of bonded silica the rubber mixture preferably contains at least one silane coupling agent.

In the context of the present invention silane coupling agents are also referred to as "silane". One or more different silane coupling agents may be used in combination with one another. The rubber mixture may thus contain a mixture of different silanes. The silane coupling agents react with the surface silanol groups of the silica or other polar groups during the mixing of the rubber/the rubber mixture (in situ) or in the context of a pretreatment (premodification) even before addition of the filler to the rubber. Employable silane coupling agents include any silane coupling agents known to those skilled in the art for use in rubber mixtures. Such coupling agents known from the prior art are bifunctional organosilanes which have at least one alkoxy, cycloalkoxy or phenoxy group as a leaving group on the silicon atom and have as another functionality a group which, optionally after dissociation, can undergo a chemical reaction with the double bonds of the polymer. The latter group may include for example the following chemical groups: —SCN, —SH, —NH$_2$ or —S$_x$— (with x=2 to 8).

Employable silane coupling agents thus include for example 3-mercaptopropyltriethoxysilane, 3-thiocyanatopropyltrimethoxysilane or 3,3'-bis(triethoxysilylpropyl) polysulfides having 2 to 8 sulfur atoms, for example 3,3'-bis(triethoxysilylpropyl) tetrasulfide (TESPT), the corresponding disulfide (TESPD), or else mixtures of the sulfides having 1 to 8 sulfur atoms with different contents of the various sulfides. TESPT may also be added as a mixture with industrial carbon black for example (trade name: X505® from Evonik).

It is preferable to employ a silane mixture which contains 40% to 100% by weight of disulfides, particularly preferably 55% to 85% by weight of disulfides and very particularly preferably 60% to 80% by weight of disulfides. Such a mixture is obtainable for example from Evonik under the trade name Si 266® which is described in DE 102006004062 A1 for example.

Blocked mercaptosilanes such as are known for example from WO 99/09036 may also be used as a silane coupling agent. It is also possible to use silanes such as are described in WO 2008/083241 A1, WO 2008/083242 A1, WO 2008/083243 A1 and WO 2008/083244 A1. Employable silanes include for example those marketed under the NXT name (e.g. 3-(octanoylthio)-1-propyltriethoxysilane) in a number of variants from Momentive, USA, or those marketed under the name VP Si 363® by Evonik Industries.

It is also conceivable to use one of the abovementioned mercaptosilanes, especially 3-mercaptopropyltriethoxysilane, in combination with processing aids (listed below), especially PEG carboxylates. In a preferred embodiment of the invention the rubber mixture contains a combination of 3-mercaptopropyltriethoxysilane and PEG carboxylates which results in particularly good properties, especially with regard to the technical object to be achieved, and a good overall level for the other properties.

The rubber mixture may also contain further activators and/or agents for binding fillers, in particular carbon black. These may include for example the compound S-(3-aminopropyl)thiosulfuric acid disclosed in EP 2589619 A1 for example and/or metal salts thereof which achieve very good physical properties of the rubber mixture, especially in combination with at least one carbon black as filler.

In a preferred embodiment the rubber mixture according to the invention contains not more than 35 phr of at least one plasticizer, wherein provided at least one plasticizer is present the total amount of plasticizer(s) is preferably 0.1 to 35 phr. Especially in combination with the abovementioned constituents this results in particularly good processability of the rubber mixture, especially of the extrudates prior to crosslinking, coupled with good properties in respect of the object to be achieved. At an amount of more than 35 phr of plasticizer(s) the heat buildup properties (hysteresis) are impaired. In addition, the conflict of objectives between reinforcing properties (stiffness/hardness) and hysteresis is impaired.

The plasticizer may also be introduced into the rubber base mixture in the corresponding amounts entirely or in part via the abovedescribed masterbatch comprising CNT and polyisoprene.

The plasticizers used in the context of the present invention include all plasticizers known to those skilled in the art such as aromatic, naphthenic or paraffinic mineral oil plasticizers, for example MES (mild extraction solvate) or RAE (residual aromatic extract) or TDAE (treated distillate aromatic extract) or rubber-to-liquid oils (RTL) or biomass-to-liquid oils (BTL), preferably having a content of polycyclic aromatics of less than 3% by weight according to method IP 346 or rapeseed oil or in particular resin acids or factices or liquid polymers having a mean molecular weight (determination by GPC=gel permeation chromatography as per BS ISO 11344:2004) between 500 and 20 000 g/mol. If additional liquid polymers are used as plasticizers in the rubber mixture according to the invention these are not included as rubber in the calculation of the composition of the polymer matrix. The plasticizer is preferably selected from the group consisting of the abovementioned plasticizers.

In a particularly preferred embodiment of the invention the masterbatch already contains at least one plasticizer (see above), preferably at least one resin acid, in particular disproportionated resin soap (for example SYLVAROS™ DRS 215 from Kraton or SYLVAROS™ DRS 40 from Kraton) or at least one mineral oil plasticizer.

In a further preferred embodiment of the invention the rubber mixture is admixed with at least one plasticizer in addition to any plasticizer present in the masterbatch. Mineral oils are particularly preferred as plasticizers.

When using mineral oil said oil is preferably selected from the group consisting of DAE (distilled aromatic extracts) and/or RAE (residual aromatic extracts) and/or TDAE (treated distilled aromatic extracts) and/or MES (mild extracted solvents) and/or naphthenic oils.

In a preferred embodiment of the invention the rubber mixture contains at least one mineral oil plasticizer, preferably at least TDAE and/or RAE, as a plasticizer. This results in particularly good processability characteristics, in particular a good miscibility of the rubber mixture.

In the production of the rubber mixture according to the invention the plasticizer(s) not already present in the masterbatch are preferably added in at least one base-mixing stage.

The rubber mixture may furthermore contain customary additives in customary parts by weight which in the course of production of said mixture are preferably added in at least one base-mixing stage. These additives include:

a) aging stabilizers, for example N-phenyl-N'-(1,3-dimethylbutyl)-p-phenylenediamine (6PPD), N,N'-diphenyl-p-phenylenediamine (DPPD), N,N'-ditolyl-p-phenylenediamine (DTPD), N-isopropyl-N'-phenyl-p-phenylenediamine (IPPD), 2,2,4-trimethyl-1,2-dihydroquinoline (TMQ);
b) activators, for example zinc oxide and fatty acids (e.g. stearic acid) and/or other activators, such as zinc complexes, for example zinc ethylhexanoate;
c) waxes;
d) hydrocarbon resins not already comprised as plasticizers;
e) masticating aids, for example 2,2'-dibenzamidodiphenyl disulfide (DBD); and,
f) processing aids, such as in particular fatty acid esters and metal soaps, for example zinc soaps and/or calcium soaps.

The quantity fraction of the total amount of further additives is 3 to 150 phr, preferably 3 to 100 phr and particularly preferably 5 to 80 phr. The total quantity fraction of further additives may contain zinc oxide (ZnO) in the abovementioned amounts. This may be any type of zinc oxide known to those skilled in the art, for example ZnO granulate or powder. The conventionally used zinc oxide generally has a BET surface area of less than 10 m$^2$/g. However, it is also possible to use a zinc oxide having a BET surface area of 10 to 100 m$^2$/g, for example so-called "nano-zinc oxides".

The rubber mixture according to the invention is sulfur-crosslinked, i.e. the vulcanization of the raw mixture on which it is based is performed in the presence of sulfur and/or sulfur donors using vulcanization accelerators. Some vulcanization accelerators can simultaneously act as sulfur donors. The accelerator is preferably selected from the group consisting of thiazole accelerators and/or mercapto accelerators and/or sulfenamide accelerators and/or thiocarbamate accelerators and/or thiuram accelerators and/or thiophosphate accelerators and/or thiourea accelerators and/or xanthogenate accelerators and/or guanidine accelerators.

It is preferable to use a sulfenamide accelerator selected from the group consisting of N-cyclohexyl-2-benzothiazolesulfenamide (CBS) and/or N,N-dicyclohexylbenzothiazole-2-sulfenamide (DCBS) and/or benzothiazyl-2-sulfenomorpholide (MBS) and/or N-tert-butyl-2-benzothiazylsulfenamide (TBBS).

Employed sulfur donor substances may be any sulfur donor substances known to those skilled in the art. If the rubber mixture contains a sulfur donor substance it is preferably selected from the group containing for example thiuram disulfides, for example tetrabenzylthiuram disulfide (TBzTD) and/or tetramethylthiuram disulfide (TMTD) and/or tetraethylthiuram disulfide (TETD) and/or thiuram tetrasulfides, for example dipentamethylenethiuram tetrasulfide (DPTT), and/or dithiophosphates, for example DipDis (bis (diisopropyl)thiophosphoryl disulfide) and/or bis(O,O-2-ethylhexylthiophosphoryl) polysulfide (e.g. Rhenocure SDT 50®, Rheinchemie GmbH) and/or zinc dichloryldithiophosphate (e.g. Rhenocure ZDT/S®, Rheinchemie GmbH) and/or zinc alkyldithiophosphate, and/or 1,6-bis(N,N-dibenzylthiocarbamoyldithio)hexane and/or diaryl polysulfides and/or dialkyl polysulfides.

Further network-forming systems as obtainable for example under the trade names Vulkuren®, Duralink® or Perkalink® or network-forming systems such as are described in WO 2010/049216 A2 can also be used in the rubber mixture. This system contains a vulcanizing agent which crosslinks with a functionality of greater than four and at least one vulcanization accelerator. The vulcanizing agent which crosslinks with a functionality of greater than four has general formula D) for example:

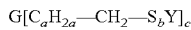

$$G[C_aH_{2a}-CH_2-S_bY]_c \qquad D)$$

wherein G is a polyvalent cyclic hydrocarbon group and/or a polyvalent heterohydrocarbon group and/or a polyvalent siloxane group containing 1 to 100 atoms; wherein each Y is selected independently from a rubber-active group containing sulfur-containing functionalities; and wherein a, b and c are integers where, independently, a=0 to 6; b=0 to 8; and c=3 to 5.

The rubber-active group is preferably selected from a thiosulfonate group, a dithiocarbamate group, a thiocarbonyl group, a mercapto group, a hydrocarbon group and a sodium thiosulfonate group (Bunte salt group). Very good abrasion and tensile properties of the rubber mixture according to the invention are achieved in this way.

It is particularly preferable to use the accelerators TBBS and/or CBS and/or diphenylguanidine (DPG). The rubber mixture may also contain vulcanization retarders.

The terms "vulcanized" and "crosslinked" are used synonymously in the context of the present invention.

The present invention further provides a vehicle tire which comprises at least one sulfur-crosslinked rubber mixture according to the invention in at least one component. The vehicle tire according to the invention may contain different embodiments of the rubber mixture according to the invention in different components. It is particularly preferable when the at least one component is at least a tread and/or a sidewall and/or a conductivity track.

The present invention further provides a process for producing a sulfur-crosslinked rubber mixture containing CNT comprising at least the following process steps:
a) producing a masterbatch from at least one polyisoprene and CNT, wherein the CNT are intensively mixed into the polyisoprene; and
b) optionally providing further constituents comprising at least one reinforcing filler and/or at least one sulfur-crosslinkable rubber and/or aging stabilizer and/or at least one silane coupling agent; and
c) optionally mixing the further constituents from step b) with the polyisoprene-CNT masterbatch; and
d) providing at least one sulfur vulcanization system;
e) mixing the mixture from step a) or c) with the sulfur vulcanization system from step d); and
f) vulcanizing the mixture from step e) to afford a sulfur-crosslinked rubber mixture.

All elucidations given hereinabove in respect of the rubber mixture according to the invention apply to the constituents.

It is thus essential to the invention that according to step a) a masterbatch containing at least one polyisoprene and CNT is produced and then optionally mixed with further constituents to afford a rubber base mixture. In the absence of steps b) and c) the masterbatch itself is a rubber base mixture which according to step e) may likewise be admixed with a sulfur vulcanization system to provide a ready-to-use rubber mixture.

Production of the polyisoprene-NR masterbatch according to step a) is carried out using processes known to those skilled in the art as described hereinabove.

The ready-to-use mixture is subjected to further processing, for example by an extrusion operation or calendering, and introduced into the appropriate mold.

This is followed by further processing by vulcanization according to step f) wherein the vulcanization system added in the context of the present invention causes a sulfur-crosslinking to occur.

For use in vehicle tires the mixture is preferably molded into a tread and/or a sidewall and/or a conductivity track as a ready-to-use mixture prior to vulcanization and applied in the known manner in the production of the green vehicle tire.

The invention shall now be more particularly elucidated with reference to comparative examples and working examples which are summarized in table 1 and FIG. 1. The mixtures marked "E" are inventive mixtures while the mixtures marked "V" are comparative mixtures.

Production of the mixtures was carried out under customary conditions in three stages in a laboratory tangential mixer.

All mixtures were used to produce test specimens by vulcanization and these test specimens were used to determine material properties typical for the rubber industry. The following test methods were employed for the abovementioned tests on test specimens:

Table 1:
Mooney viscosity according to ASTM D1646; for example ML1+4 at 100° C. (Mooney units M.U
Shore A hardness at room temperature by durometer according to DIN ISO 7619-1
Rebound elasticity at 70° C. according to DIN 53 512 or ISO 4662 or ASTM D 1054
Tensile strength, elongation at break and stress values at 50% and 300% elongation at room temperature according to DIN 53 504 (M50 and M300)
Abrasion at room temperature according to DIN/ISO 4649
Dispersion using Dispergrader (disperGRADER microscope; 100 times magnification)
FIG. 1:
Specific electrical volume resistance according to DIN IEC 60093; the FIGURE plots ohm mm (y-axis) against vol % of CNT based on the respective rubber mixture (x-axis)

TABLE 1

| Constituent | Unit | V1 | E1 | E2 |
|---|---|---|---|---|
| NR (TSR) | phr | 60 | 47 | 35 |
| BR | phr | 10 | 10 | 10 |
| SSBR | phr | 30 | 30 | 30 |
| Carbon black | phr | 43 | 31 | 20 |
| NR-CNT MB [a] | phr | — | 17.69 | 34.01 |
| Silica | phr | 16 | 16 | 16 |
| Silane [b] | phr | 2.25 | 2.25 | 2.25 |
| Further additives [c] | phr | 17.1 | 17.1 | 17.1 |
| Accelerator [d] | phr | 1.7 | 1.7 | 1.7 |
| Sulfur | phr | 1.5 | 1.5 | 1.5 |
| Viscosity | M.U. | 74 | 60 | 60 |
| Hardness RT | Shore A | 63 | 60 | 60 |
| Rebound elasticity 70° C. | % | 60 | 61 | 61 |
| Tensile strength | MPa | 22 | 22 | 21 |
| M50 | MPa | 1.4 | 1.3 | 1.3 |
| M300 | MPa | 12 | 11 | 10 |
| Elongation at break | % | 522 | 560 | 570 |
| Dispersion | % | 88 | 93 | 87 |
| Abrasion | mm$^3$ | 114 | 105 | 105 |

Employed Substances of Table 1:
a) NR-CNT masterbatch: CNT predispersed in NR: 67.3% by weight NR, 18.7% by weight CNT, 14% by weight resin acids; density 1.03 g/cm$^3$
b) Silane: TESPD+3-mercaptopropyltriethoxysilane
c) Further additives: processing aids: PEG carboxylic ester; hydrocarbon resin; aging stabilizer; antiozonant wax, zinc oxide; stearic acid
d) Accelerator: DPG+CBS As is shown in table 1 the inventive rubber mixtures E1 and E2 exhibit improved abrasion behavior. The other properties are at a comparable level or are even likewise improved.

Electrical conductivity/electrical resistance of various comparative mixtures and inventive mixtures was also investigated. The results are summarized in FIG. 1.

The mixture series have the following compositions (explanation relating to FIG. 1):

COMPARATIVE EXAMPLE V2

ESBR1500_CNT_1: ESBR is the sole rubber matrix, partly from an ESBR-CNT masterbatch and partly added separately:

One data point for 5 vol % CNT in the rubber mixture; to this end 67.8 phr of a masterbatch—containing 16.1% by weight CNT and 82.9% by weight ESBR and balance plasticizer—were mixed with 43.8 phr of ESBR. Further constituents: 3 phr of zinc oxide, 2 phr of stearic acid, 1.5 phr of sulfur, 1.3 phr of accelerator TBBS.

INVENTIVE EXAMPLES E3, E4, E5

NR_CNT_1: NR is the sole rubber matrix, partly from an NR-CNT masterbatch and partly added separately:

3 data points for 4.5 and 6.5 and 7.6 vol % of CNT in the rubber mixture:
E3: 4.5 vol % CNT: 60 phr of an NR-CNT masterbatch—containing 82.8% by weight NR and 17% by weight CNT and balance plasticizer—and 50.32 phr of NR.
E4: 6.5 vol % CNT: 90 phr of the NR-CNT masterbatch (as described under 4.5 vol % CNT) and 25.48 phr of NR.
E5: 7.6 vol % CNT: 120.77 phr of the same NR-CNT masterbatch and no additional NR, i.e. 0 phr of separate NR.

The mixtures also contained the same further constituents as listed under ESBR1500_CNT_1.

INVENTIVE EXAMPLES E6, E7, E8, E9, E10

50 NR/50 ESBR (NR_CNT_MB): The rubber matrix consists of 50% by weight ESBR and 50% by weight NR; the CNT are exclusively predispersed in the NR (NR-CNT masterbatch):

5 data points for 1.5 and 2 and 3 and 4 and 4.7 vol % of CNT in the rubber mixture:
E6: 1.5 vol % CNT: 18.59 phr of the NR-CNT masterbatch (as described under 4.5 vol % CNT) and 34.61 phr of NR and 50 phr of ESBR;
E7: 2 vol % CNT: 24.91 phr of the same NR-CNT masterbatch and 29.37 phr of NR and 50 phr of ESBR;
E8: 3 vol % CNT: 37.75 phr of the same NR-CNT masterbatch and 18.74 phr of NR and 50 phr of ESBR;
E9: 4 vol % CNT: 50.86 phr of the same NR-CNT masterbatch and 7.89 phr of NR and 50 phr of ESBR;
E10: 4.7 vol % CNT: 60.39 phr of the same NR-CNT masterbatch and no additional NR, i.e. 0 phr of NR and 50 phr of ESBR;

The mixtures also contained the same further constituents as listed under ESBR1500_CNT_1.

COMPARATIVE EXAMPLES V3, V4, V5 AND V6

50 NR/50 ESBR (ESBR_CNT_MB): The rubber matrix consists of 50% by weight ESBR and 50% by weight NR; the CNT are exclusively predispersed in the ESBR (ESBR-CNT masterbatch):

4 data points for 2 and 3 and 4 and 4.5 vol % of CNT:

V3: 2 vol % CNT: 26.55 phr of the ESBR-CNT masterbatch (as described under ESBR1500_CNT_1) and 27.99 phr of ESBR and 50 phr of NR;

V4: 3 vol % CNT: 40.26 phr of the ESBR-CNT masterbatch (as described under ESBR1500_CNT_1) and 16.63 phr of ESBR and 50 phr of NR;

V5: 4 vol % CNT: 54.22 phr of the ESBR-CNT masterbatch (as described under ESBR1500_CNT_1) and 5.05 phr of ESBR and 50 phr of NR;

V6: 4.5 vol % CNT: 60.31 phr of the ESBR-CNT masterbatch (as described under ESBR1500_CNT_1) and no additional ESBR, i.e. 0 phr of ESBR and 50 phr of NR;

The mixtures also contained the same further constituents as listed under ESBR1500_CNT_1.

COMPARATIVE EXAMPLES V7, V8, V9 AND V10

50 NR/50 ESBR (½ NR_CNT_MB, ½ ESBR_CNT_MB): The rubber matrix consists of 50% by weight ESBR and 50% by weight NR; the CNT are predispersed both in ESBR (ESBR-CNT MB) and in the NR (NR-CNT masterbatch):

V7: 1.5 vol % CNT: 9.29 phr of the NR-CNT masterbatch (as described under 4.5 vol % CNT) and 42.3 phr of NR and 9.91 phr of the ESBR-CNT masterbatch (as described under ESBR1500_CNT_1) and 41.79 phr of ESBR;

V8: 2 vol % CNT: 12.46 phr of the NR-CNT masterbatch (as described under 4.5 vol % CNT) and 39.69 phr of NR and 13.27 phr of the ESBR-CNT masterbatch (as described under ESBR1500_CNT_1) and 39 phr of ESBR;

V9: 5 vol % CNT: 32.12 phr of the NR-CNT masterbatch (as described under 4.5 vol % CNT) and 23.4 phr of NR and 34.24 phr of the ESBR-CNT masterbatch (as described under ESBR1500_CNT_1) and 21.61 phr of ESBR;

V10: 8.7 vol % CNT: 60.39 phr of the NR-CNT masterbatch (as described under 4.5 vol % CNT) and no additional, i.e. 0 phr, NR and 60.31 phr of the ESBR-CNT masterbatch (as described under ESBR1500_CNT_1) and no additional, i.e. 0 phr, ESBR;

The mixtures also contained the same further constituents as listed under ESBR1500_CNT_1.

As is apparent in FIG. 1 (in conjunction with the above explanations) the inventive rubber mixtures (E3, E4, E5 and E6, E7, E8, E9, E10) in which the CNT are exclusively predispersed in at least one polyisoprene, here NR, achieve, surprisingly, a markedly lower electrical resistance and thus a markedly improved electrical conductivity.

The invention claimed is:

1. A method comprising:
providing a sulfur-crosslinkable rubber mixture comprising a silane coupling agent and carbon nanotubes, wherein the carbon nanotubes are predispersed in at least one polyisoprene;
molding the sulfur-crosslinkable rubber mixture into one or more components of a vehicle tire, wherein one of the one or more components of the vehicle tire is a conductivity track;
vulcanizing the vehicle tire;
wherein the sulfur-crosslinkable rubber mixture has a specific electrical volume resistance value, according to DIN IEC 60093, of $\leq 1 \times 10^4$ ohm mm after vulcanization;
wherein the conductivity track is arranged between an electrically conductive tire component and a tire sensor thus to transmit to the sensor information about the electrical conductivity of the tire; and,
wherein the silane coupling agent is selected from the group consisting of 3-mercaptopropyltriethoxysilane, 3-thiocyanatopropyltrimethoxysilane, 3,3'-bis(triethoxysilylpropyl) polysulfides having 2 to 8 sulfur atoms, and mixtures thereof.

2. The method as claimed in claim 1, wherein the at least one polyisoprene is at least one natural polyisoprene.

3. The method as claimed in claim 1, wherein the sulfur-crosslinkable rubber mixture comprises the carbon nanotubes in an amount of 0.1 to 25 phr.

4. The method as claimed in claim 1, wherein the sulfur-crosslinkable rubber mixture further comprises at least one sulfur-crosslinkable rubber.

5. The method as claimed in claim 1, wherein the sulfur-crosslinkable rubber mixture further comprises at least one reinforcing filler, and wherein a quantity ratio of the at least one reinforcing filler to carbon nanotubes is in the range of from 100:1 to 2:1.

6. The method as claimed in claim 1, wherein the sulfur-crosslinkable rubber mixture contains not more than 35 phr of plasticizers.

7. The method as claimed in claim 1, wherein the one or more components further comprises a component selected from the group consisting of a tread, a sidewall, an inner component and a flange profile.

8. The method as claimed in claim 1, wherein the sulfur-crosslinkable rubber mixture is molded into a tread of the vehicle tire.

9. The method as claimed in claim 1, wherein the sulfur-crosslinkable rubber mixture is molded into a sidewall of the vehicle tire.

10. The method as claimed in claim 1, wherein the sulfur-crosslinkable rubber mixture is molded into a flange profile of the vehicle tire.

11. The method as claimed in claim 1, wherein the sulfur-crosslinkable rubber mixture is molded into an inner component of the vehicle tire.

12. The method as claimed in claim 1, wherein the sulfur-crosslinkable rubber mixture has a specific electrical volume resistance value, according to DIN IEC 60093, of $\leq 1 \times 10^3$ ohm mm after vulcanization.

13. The method as claimed in claim 1, wherein the sulfur-crosslinkable rubber mixture has a specific electrical volume resistance value, according to DIN IEC 60093, of $\leq 1 \times 10^2$ ohm mm after vulcanization.

14. The method as claimed in claim 1, wherein the sulfur-crosslinkable rubber mixture has a specific electrical volume resistance value, according to DIN IEC 60093, of $\leq 10$ ohm mm after vulcanization.

15. The method as claimed in claim 1, wherein the sulfur-crosslinkable rubber mixture comprises carbon nanotubes in an amount of $\geq 3\%$ by volume, and wherein the sulfur-crosslinkable rubber mixture has a specific electrical volume resistance value, according to DIN IEC 60093, of ≤1×10³ ohm mm after vulcanization.

16. The method as claimed in claim 15, wherein the sulfur-crosslinkable rubber mixture comprises carbon nanotubes in an amount of ≥4% by volume, and wherein the sulfur-crosslinkable rubber mixture has a specific electrical volume resistance value, according to DIN IEC 60093, of ≤1×10² ohm mm after vulcanization.

17. The method as claimed in claim 16, wherein the sulfur-crosslinkable rubber mixture comprises carbon nanotubes in an amount of ≥4.5% by volume, and wherein the sulfur-crosslinkable rubber mixture has a specific electrical volume resistance value, according to DIN IEC 60093, of ≤10 ohm mm after vulcanization.

18. The method as claimed in claim 17, wherein the sulfur-crosslinkable rubber mixture comprises carbon nanotubes in an amount of ≥6.5% by volume, and wherein the sulfur-crosslinkable rubber mixture has a specific electrical volume resistance value, according to DIN IEC 60093, of ≤1 ohm mm after vulcanization.

19. The method as claimed in claim 1, wherein the sulfur-crosslinkable rubber mixture is molded into a tread of the vehicle tire, wherein the sulfur-crosslinkable rubber mixture comprises carbon nanotubes in an amount of ≥3% by volume, and wherein the sulfur-crosslinkable rubber mixture has a specific electrical volume resistance value, according to DIN IEC 60093, of ≤1×10³ ohm mm after vulcanization.

\* \* \* \* \*